United States Patent [19]

Yamaoka et al.

[11] Patent Number: 4,688,193
[45] Date of Patent: Aug. 18, 1987

[54] BIT PROCESSING UTILIZING A ROW AND COLUMN LADDER SEQUENCE

[75] Inventors: Hiromasa Yamaoka; Tadashi Okamoto, both of Hitachi; Yuzaburo Iwasa, Toukai; Kouichi Kimura, Hitachi, all of Japan

[73] Assignee: Hitachi, Ltd., Tokyo, Japan

[21] Appl. No.: 635,153

[22] Filed: Jul. 27, 1984

[30] Foreign Application Priority Data

Aug. 1, 1983 [JP]  Japan .................. 58-139445

[51] Int. Cl.⁴ .................................. G06F 9/00
[52] U.S. Cl. ..................... 364/900; 364/147
[58] Field of Search ... 364/200 MS File, 900 MS File, 364/147

[56] References Cited

U.S. PATENT DOCUMENTS

| | | | |
|---|---|---|---|
| 3,944,987 | 3/1976 | Koyanagi et al. | 364/900 |
| 3,969,723 | 7/1976 | Kennicott | 364/200 |
| 4,316,260 | 2/1982 | Hideshima et al. | |
| 4,386,403 | 5/1983 | Hsieh | 364/300 |
| 4,432,047 | 2/1984 | Okayama | 364/900 X |
| 4,441,161 | 4/1984 | Sasaki et al. | 364/900 |
| 4,445,169 | 4/1984 | Wakita | 364/147 |
| 4,449,180 | 5/1984 | Ohshima | 364/147 |
| 4,486,830 | 12/1984 | Taylor | 364/146 |

*Primary Examiner*—Archie E. Williams, Jr.
*Assistant Examiner*—David L. Clark
*Attorney, Agent, or Firm*—Antonelli, Terry & Wands

[57] ABSTRACT

A relay ladder sequence circuitry having i columns and j rows is divided into a plurality of sections each having a predetermined number of rows, and the bit informations are processed in a parallel manner in the rows of the sections. More specifically, the program in accordance with the sequence ladder construction is memorized and are successively read out as the addresses of the program are appointed. The signals of relay contacts as the bit information are processed for each line in accordance with the read out program, so that a high processing speed is attained.

8 Claims, 27 Drawing Figures

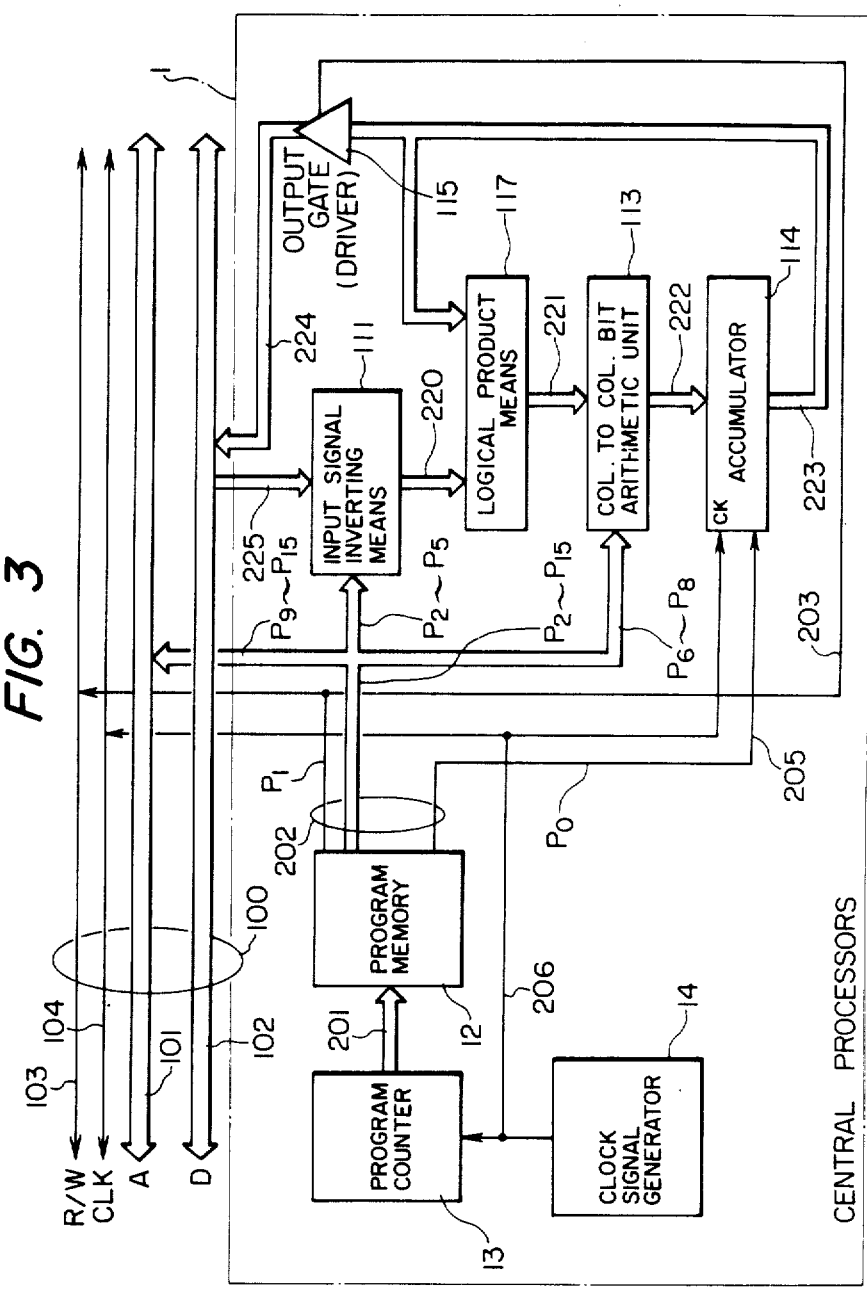

FIG. 4(A)

| P0 P1 | P2 P3 P4 P5 | P6 P7 P8 P9 | P10 P11 P12 P13 P14 P15 |
|---|---|---|---|
| CTL | OP1 | OP2 | IOADDR |

FIG. 4(B)

| PROGRAM STEP | P0 | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|---|
| a   | 1 | 0 | 0 | 0 | 0 | 1 | 1 | 0 | 0 | 0 | 0 | 0 | 0 | 1 | 0 | 1 |
| a+1 | 0 | 0 | 0 | 0 | 1 | 0 | 0 | 0 | 1 | 0 | 0 | 0 | 0 | 0 | 0 | 0 |
| a+2 | 0 | 0 | 1 | 0 | 0 | 0 | 0 | 0 | 0 | 0 | 0 | 0 | 0 | 0 | 1 | 1 |
| a+3 | 1 | 0 | 0 | 0 | 0 | 0 | 0 | 1 | 0 | 0 | 0 | 0 | 1 | 1 | 0 | 0 |
| a+4 | 0 | 0 | 0 | 0 | 0 | 0 | 0 | 0 | 0 | 0 | 0 | 0 | 1 | 0 | 0 | 1 |

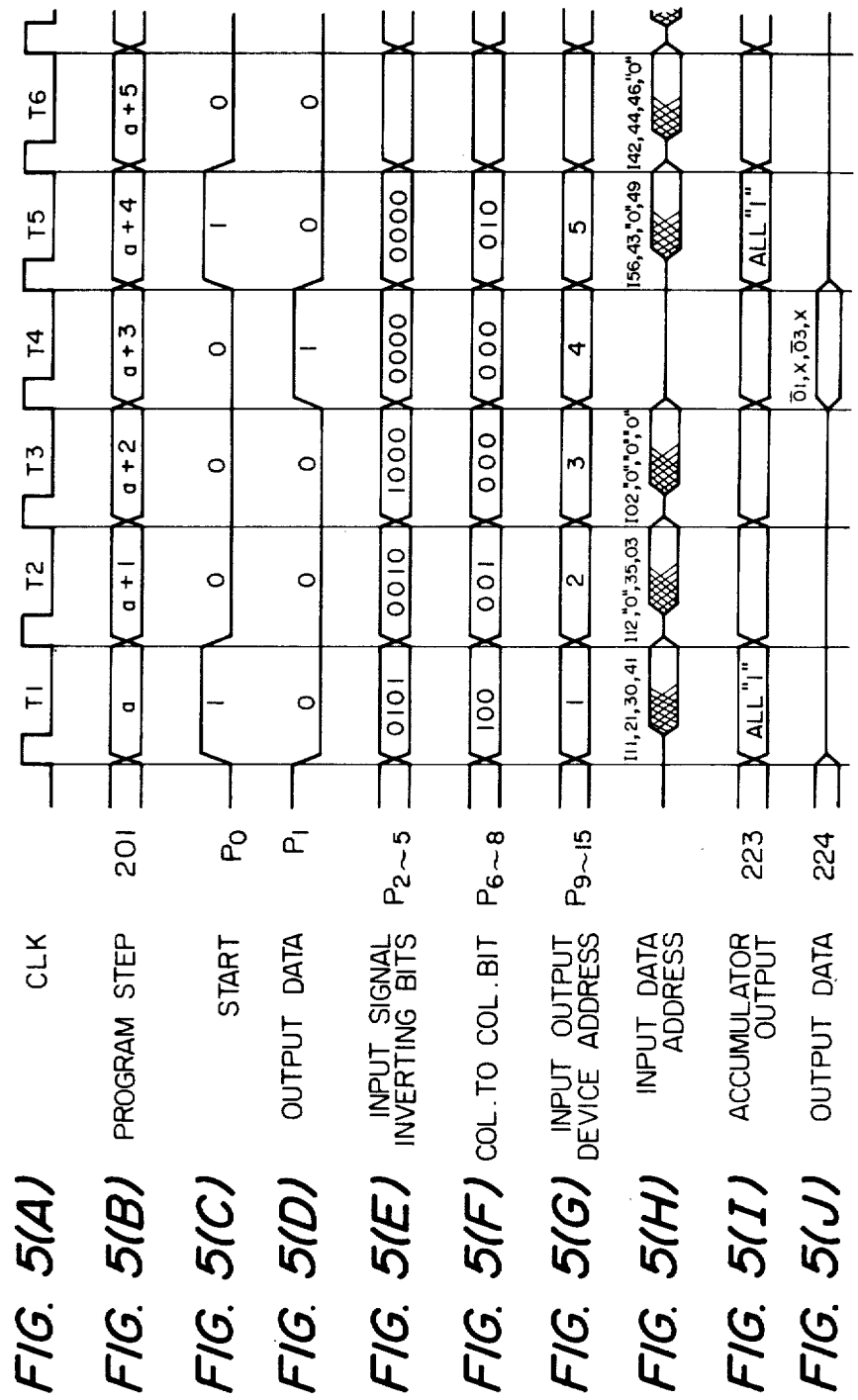

FIG. 13(A)

| ADDRESS | | STORE CONTENT |
|---|---|---|
| $16\alpha +$ | 0 | I11 |
| | 1 | I21 |
| | 2 | I30 |
| | 3 | I41 |
| | 4 | I12 |
| | 5 | 0 |
| | 6 | I35 |
| | 7 | I03 |
| | 8 | I02 |
| | 9 | 0 |
| | 10 | 0 |
| | 11 | 0 |
| | 12 | $\overline{O}\,1$ |
| | 13 | 0 |
| | 14 | $\overline{O}\,3$ |
| $16\alpha +$ | 15 | 0 |
| $16(\alpha+1)+$ | 0 | I56 |

FIG. 13(B)

| ADDRESS | | STORE CONTENT | | | |
|---|---|---|---|---|---|
| $4\alpha +$ | 0 | (I11) | (I21) | (I30) | (I41) |
| | 1 | (I12) | 0 | (I35) | (I03) |
| | 2 | (I02) | 0 | 0 | 0 |
| $4\alpha +$ | 3 | $(\overline{O}\,1)$ | 0 | $(\overline{O}\,3)$ | 0 |
| $4(\alpha+1)+$ | 0 | (I56) | (I43) | 0 | (I49) |
| | 1 | (I42) | (I44) | (I46) | 0 |

BIT PROCESSING UTILIZING A ROW AND COLUMN LADDER SEQUENCE

BACKGROUND OF THE INVENTION

1. Field of the Invention

The present invention relates to sequence control, and more particularly to a central processor suitable for use in sequence control.

In general, from the viewpoint of the controlled content, D.D.C. (Direct Digital Control) is divided broadly into numerical operation control dealing with numerical data and sequence control performing logical operation of 1-bit data. 1-bit data corresponds to, for example, an ON/OFF signal generated from a relay contact.

The present invention relates to a central processor in a computer system, and more particularly to a central processor optimized for use as a P.C. (Programable Controller) which is to be employed in D.D.C. for general industries.

With increase in the number of contact information from the plant to be controlled, there has been an attempt to provide a system in which such information is processed using a digital computer. In not a few cases, however, processing of information providing an indication with 1-bit is rather inefficient for computers adapted to execute processing for on a word basis.

The present invention has been accomplished with a view of solving the problem as mentioned above and it is intended to provide a processor which can improve the processing ability through parallel execution of bit processing using a single unit of a central processor.

2. Description of the Prior Art

Because a general purpose digital computer is adapted to run processing in words, the logical sum of a first bit and a second bit in the same word, for example, is calculated as follows:

Namely, it is necessary that the data word to be processed is once stored in a register, then the data word is shifted to put the second bit in the position of the first bit, and then the new content at that position is added to the content previously stored in the register to obtain the logical sum.

There is also known a system so configured that each bit is given an address and an arithmetic operation is run by a one-bit accumulator (e.g., Motorola Co., Model MC14500B). However, this system has a limitation in its processing speed as a matter of course, because the data capable of being processed simultaneously is only 1 bit. Further, it is required to prepare a stack memory or a working memory for the so-called parenthesis operation (e.g., output O1 is given by AND between OR of inputs I1, I2 and OR of inputs I3, I4: $O11 = (I1 + I2) \cdot (I3 + I4)$) which occur frequently in sequence control, thus resulting in a fear that processing becomes complicated and the processing speed is lowered. In addition, Japanese Patent Application Laid-Open Official Gazette Nos. 55-116141 and 54-124646, disclose a method using specific processors corresponding to the respective bits.

Furthermore, examples of a sequence controller based on processing of a data word are described, for example, in U.S., Pat. Nos. 4,316,260 and 3,944,987.

BRIEF SUMMARY OF THE INVENTION

It is an object of the present invention to achieve higher-speed processing of a sequence program using a computer.

Another object of the present invention is to provide a central processor which enables bit processing in sequence control to be run at a high speed.

The present invention is featured in that i columns out of constituent elements of i columns and j rows which constitute a ladder sequence are divided into blocks each including a predetermined plural number of columns, and bit information is processed in parallel for each row of the divided columns sequentially using a single central processor.

Another feature of the present invention is that column to column arithmetic means of bit information is provided to perform a column to column connection operation in parallel processing of the sequence ladder.

Still another feature of the present invention is that program instruction words are configured by alloting the bits of part of the instruction word for the sequence program to those bits for discriminating the presence or absence of a column to column connection.

Still another feature of the present invention is that a central processor comprises logical inverting means capable of logically inverting an arbitrary bit of input data, logical product arithmetic means for receiving the inverted signal and the content of an accumulator to run logical product operation, column to column arithmetic means of bit information for running an arithmetic operation between adjacent column bits in accordance with the content of an operation (OP) code for the stored program and an output signal from the logical product arithmetic means, an accumulator for latching the result of the arithmetic operation, and a driver adapted to output the content of the accumulator.

BRIEF DESCRIPTION OF THE DRAWINGS

FIG. 3 shows an embodiment of a central processor for sequence control according to the present invention.

FIG. 4(A) shows configuration of an instruction, FIG. 4(B) shows an example of a processing program for the sequence ladder circuitry of FIG. 2.

FIG. 5 is a time chart showing the flow of processing of FIG. 4(C).

FIG. 13(A) shows the content of an input/output control table 18 corresponding to the example of FIG. 12, and FIG. 13(B) shows the content of a data memory 16 in FIG. 13(B), by way of example.

DESCRIPTION OF THE PREFERRED EMBODIMENTS

First, summary of a programmable sequence controller and ladder sequence will be described by referring to FIGS. 1 and 2.

Figure 1:
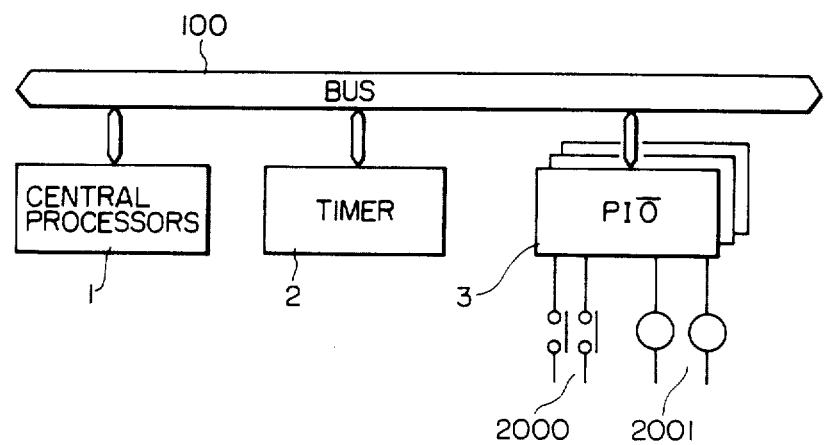
FIG. 1 is general configuration diagram of sequence control according to the present invention.

In FIG. 1, 1 is a central processor, 2 is a timer and 3 is a process input/output unit (PI/O). The PI/O takes in input information 2000 and issues an operation signal to an actuator 2001 on the process side. Then, data is transmitted to and from the central processor 1 through a bus 100.

Figure 2:
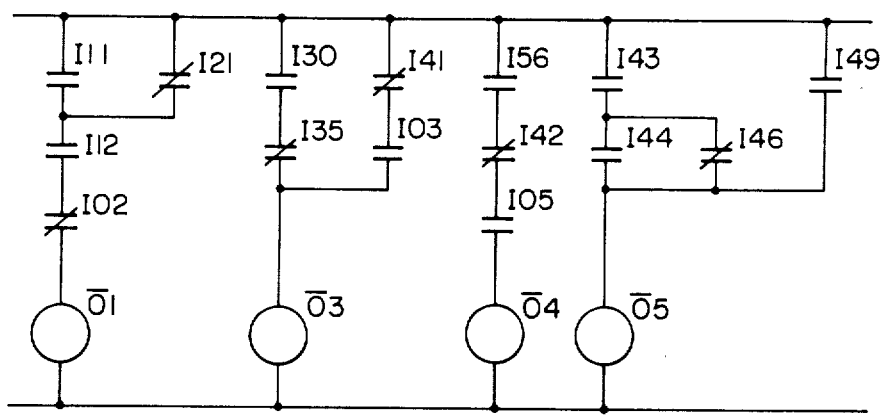
FIG. 2 is an explanatory view of a relay sequence ladder circuitry.

FIG. 2 shows an example of a ladder sequence in which I11, I12 . . . represent inputs and O1, O3 . . . represents outputs. Such notaton is very standard in programmable controllers, so the inputs correspond to contacts of relays, the outputs to exciting coils of the relays and connection between the inputs and outputs to wirings between the relays. There are two types of an input symbol with and without an oblique line, in which the symbol with an oblique line represents the so-called B (normally-ON) contact that is conducted with the input assuming "0" and not conducted with the output assuming "1", while the symbol without an oblique line represents the so-called A (normally-OFF) contact that is conducted with the input assuming "1" and not conducted with the output assuming "0". Stated differently, in case of the input indicated by the symbol with an oblique line, the input is logically inverted.

Description will be made more specifically with reference to the example of FIG. 2. For example, the condition of obtaining the output of "1" is such that I11 or I21 is conducted and I12, I02 are both conducted. Since I11, I12 are A contacts and I21, I02 are B contacts, the condition can be represented by the following logical formula:

$$O = (I11 + \overline{I21}) \cdot I12 \cdot \overline{I02}$$

Similarly, the outputs O3, O5 and O6 can be represented as follows:

$$O3 = I30 \cdot \overline{I35} + \overline{I41} \cdot I03$$

$$O5 = I56 \cdot \overline{I42} \cdot I53$$

$$O6 = I43 \cdot (I44 + \overline{I46}) + I49$$

As will be seen from the above, a ladder sequence is to represent the logical function in the form of current flow and is advantageous in that the logic can be intuitively grapsed with ease, so it is generally employed in a wide range of sequence control applications.

The present invention is intended to execute the ladder sequence as mentioned above by the use of programs each corresponding to each element of the ladder from the uppermost step of blocks in order, each block comprising a plurality of columns of the ladder.

In other words, the feature of the present invention is in constituting a central processor for sequence control which is adapted to perform parallel processing for plural columns of the ladder sequence circuitry as shown in FIG. 2, thus making it possible to improve the processing speed.

In the following embodiments, there will be described the case of parallel execution of the 4-column ladder for simplicity.

FIG. 3 illustrates the configuration of the central processor 1 of a programmable controller which is one embodiment of the present invention.

A clock signal 206 generated from a clock generator 14 is used to update a program counter 13 and as both a latch pulse signal for an accumulator 114 and a timing signal 104 for an input/output bus. Timing will be described later in detail and the control flow will now be explained. The program counter 13 is designed to impart an address 201 for a program memory 12 and it is incremented by +1 for each operation step. The program memory 12 is for storing the information of the ladder sequence to be run in the form of a program and has a data width of 16 bits in this embodiment.

The significance of respective bits of the program memory 12 will be described herein by referring to FIGS. 4(A) to 4(C).

In this embodiment, as shown in FIG. 4(A), an instruction comprises a control portion (CTL), a first OP code portion (OP1), a second OP code portion (OP2) and an IO address portion (IOADDR). These four portions have respective meanings as follows:

CTL Portion: comprising the two bits P0 and P1.
  P0 is a bit indicative of sequence start and corresponds to starting of sequence, i.e., the section of an electric power supply bus in the ladder sequence.
  P1 is a bit for controlling the direction of transmission of input/output, and it assumes "0" upon taking in a signal from the relay contact and "1" upon issuing a signal to the relay coil.

OP1 Portion: comprising the 4 bits P2-P5.
  P2-P5 are bits indicating whether the respective input contacts are A contacts or B contacts, and each bit assumes "1" in case of the B contact. In the absence of the relevant input, this is regarded as an A contact input in this embodiment so that each bit assumes "0".

OP2 Portion: comprising the 3 bits P6-P8.
  P6-P8 are bits indicating the presence or absence of "OR connection" in ladder sequence, and each bit assumes "1" in the presence of OR connection (i.e., in the presence of a short bar).

IOADDR Portion: comprising the 7 bits P9-P15.
  P9-P15 are bits indicating input addresses of the contacts and output addresses of the coils, i.e., indicating addresses of the timer 2 and the process input/output unit 3 in FIG. 1.

Figure 4C:
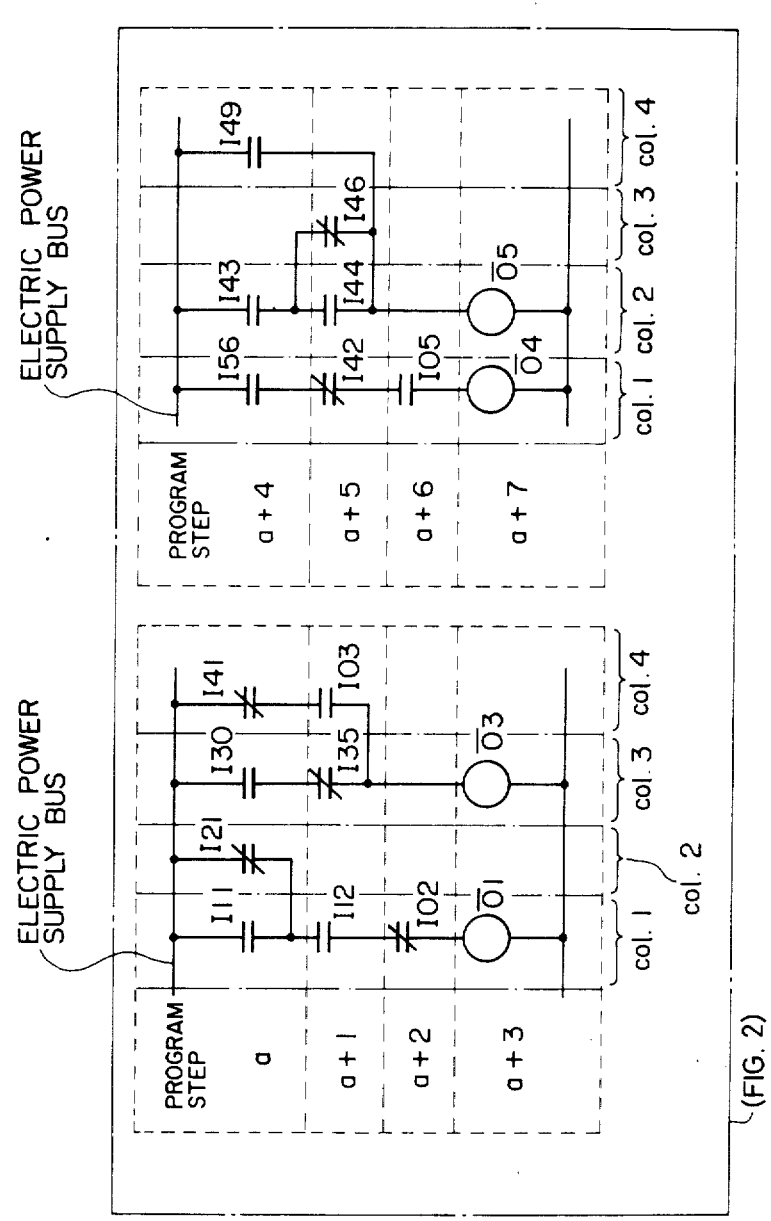
FIG. 4(C) shows an example in which the sequence ladder circuitry of FIG. 2 is divided into two parts each comprising four columns.

FIG. 4(C) illustrates the case where the example of FIG. 2 is subjected to parallel processing of four columns, i.e., col. 1-col. 4 as well as serial processing of program steps a, a+1, a+2, a+3 and a+4, a+5, a+6, a+7. FIG. 4(B) illustrates an example of the bit configuration of the program steps a—a+4 in the case that one word comprises 16 bits.

More specifically, FIG. 4(C) shows the case where the ladder sequence of FIG. 2 is divided into two blocks each comprising 4 columns. Each block is in turn divided into four steps to provide the program steps a, a+1, . . . , a+7 as shown in figure, and the information of each program step is changed to a bit pattern in the form of a program, which is illustrated in FIG. 4(B). In the step a, for example, there establish P1="1" because of starting of the sequence and P1="0" because the data is in the input direction. The contacts I11, I21, I30 and I41 correspond to P2 (col. 1), P3 (col. 2), P4 (col. 3) and P5 (col. 4), respectively, and this establishes P5, P6="1" because I21 and I41 are B contacts. Further, because an "OR connection" is present between I11 and I21, P6 assumes "1", while because an "OR connection" (short bar) is absent between I21 and I30 as well as between I30 and I41, P7 and P8 assume "0".

FIG. 4(B) also illustrates the case where the 4 bits P12–P15 are allocated to the contacts I11, I21, I30 and I41 as addresses thereof.

Returning now to FIG. 3, there will be described the operation of the central processor. An input signal inverting means 111 functions to logically invert the corresponding data out of input data 225 if the values of an output signal from the program memory 12, i.e., P2–P5, are "1". The logical product of an output 220 of the input signal inverting means 111 and the content 223 of the accumulator is obtained by a logical product means 117. It is to be noted that, at the starting of the sequence, the accumulator output is forcibly turned to "1" with the aid of the output PO from the program memory 12, thus causing the output 221 of the logical product means 117 to become the same as the input 220 thereof in value. A column to column bit arithmetic unit 113 produces the logical sum of the corresponding adjacent bits, if P6–P8 from the program memory are "1", and its output 222 is latched in the accumulator 114 together with clock pulses 206. When the instruction is an output instruction, the content 223 of the accumulator 114 is issued to a data bus 102(D) as an output signal 224 through an output gate 115.

The control flow in the respective sections has been described in the above. Next, there will be proved following the time chart shown in FIG. 5 that this embodiment runs an operation as determined by the ladder sequence.

T1: executes the instruction of the program step a.

Because of the data output bit P1 = "0", the content of IO addresses P9–P15 (I11, I21, I30, I41) is taken in as the input data 225.

Because of the input signal inverting bits P2–P5 = (0, 1, 0, 1), the output data 220 from the input signal inverting means 111 becomes (I11, $\overline{I21}$, I30, $\overline{I41}$).

Further, because of the start bit PO = "1", the accumulator output 223 becomes (1, 1, 1, 1) and the output $\overline{221}$ from the logical product means 117 becomes (I11, $\overline{I21}$, I30, $\overline{I41}$).

Because of the column to column bits P6–P8 = (1, 0, 0), the output 222 from the column to column bit arithmetic unit 113 becomes (I11+$\overline{I21}$, I11+$\overline{I21}$, I30, I41).

The above values are held in the accumulator 114 in synchronous relation with rising of the next clock.

T2: executes the instruction of the program step a+1.

Because of the data output bit = "0", the content of IO addresses P9–P15 (I12, "0", I35, I03) is taken in as the input data.

Because of the input signal inverting bits P2–P5 = (0, 0, 1, 0), the output data 220 from the input signal inverting means 111 becomes (I12, "0"; $\overline{I35}$, I03).

Further, because of the start bit PO = "1", the accumulator output 223 holds the previous value, i.e., (I11+$\overline{I21}$, I11+$\overline{I21}$, I30, $\overline{I41}$), and the output $\overline{221}$ of the logical product means 117 becomes (I12(I11+$\overline{I21}$), "0", $\overline{I35}$·I30, I03·$\overline{I41}$).

Because of the column to column bits P6–P8 = (0, 0, 1), the output 222 from the column to column bit arithmetic unit 113 becomes (I12·(I1+$\overline{I21}$), "0", $\overline{I35}$·I30+I03·$\overline{I41}$, $\overline{I35}$·I30+I03·$\overline{I41}$).

The above values are held in the accumulator 114 in synchronous relation with rising of the next clock.

T3: executes the instruction of the program step a+2.

Considering in a similar way to the case of T2, the output 222 from the column to column bit arithmetic unit 113 becomes ($\overline{I02}$·I12·(I11+$\overline{I21}$), "0", (I35·I30+I03·I41), "0").

The above values are held in the accumulator 114 in synchronous relation with rising of the next clock.

T4: executes the instruction of the program step a+3.

Because of the data output P1 = "1", the values of the accumulator 114 are output to the IO addresses P9–P15.

The foregoing represents the processing of the program steps a—a+3. This corresponds to processing in the left-hand half ladder circuit in FIG. 4(C), and subsequent steps are processed similarly.

Figure 6:
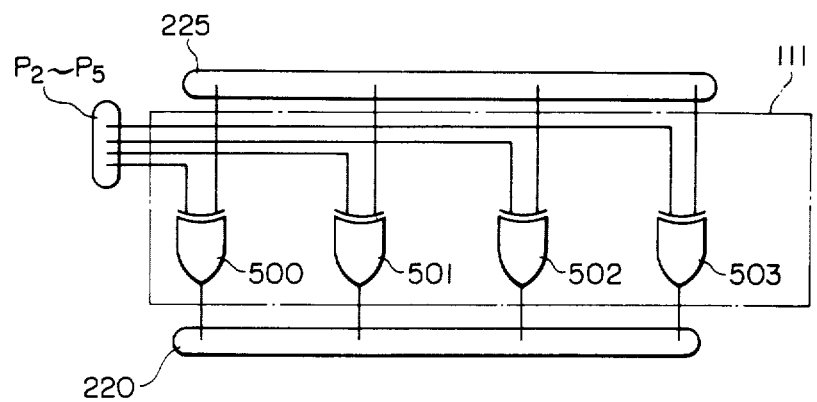
FIG. 6 shows an example of circuit configuration of an input inverting section.

Constituent elements of the respective sections in FIG. 3 will now be described. FIG. 6 illustrates an example of the circuit configuration of the input signal inverting means 111. The means 111 comprises exclusive logical sum gates 500–503 to produce the exclusive logical sum of the input data signal 225 and each of the input signal inverting bits P2–P5.

Figure 7:
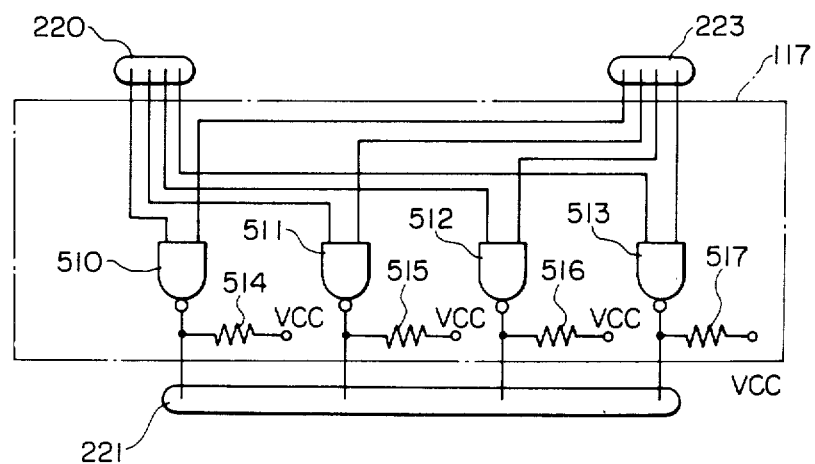
FIG. 7 shows a configuration example of a logical product arithmetic unit.

FIG. 7 illustrates the configuration of the logical product means 117 which comprises open collector type NAND gates 510–513. Outputs from the gates are pulled up through pull-up resistors 514–517 for potential, respectively. Incidentially, VCC designates the collector voltage.

Figure 8A:
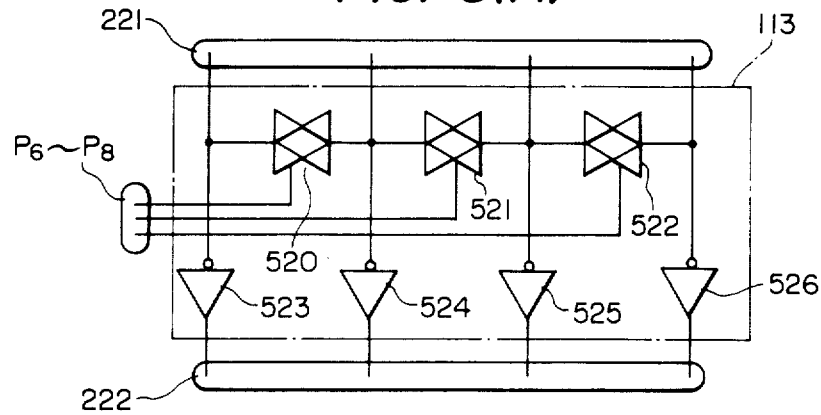
FIG. 8(A) shows an example of circuit configuration of a bit to bit arithmetic unit.

FIG. 8(A) illustrates a configuration example of the column to column bit arithmetic unit 113, which comprises transfer gates 520–522 and inverting gates 523–526. The transfer gates 520–522 are respectively controlled with the signals of P6–P8, so that the corresponding analog switch is conducted when any of P6–P8 assumes "1". This function establishes the wired OR logic between the column to column bits, thus making it possible to run the predetermined operation.

Figure 8B:
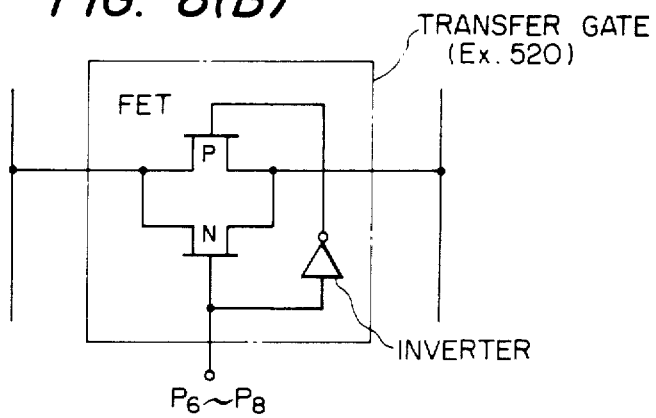
FIG. 8(B) shows an example of circuit configuration of a transfer gate.

FIG. 8(B) illustrates a configuration example of the transfer gate. Namely, an FET is employed in this example.

Figure 9:
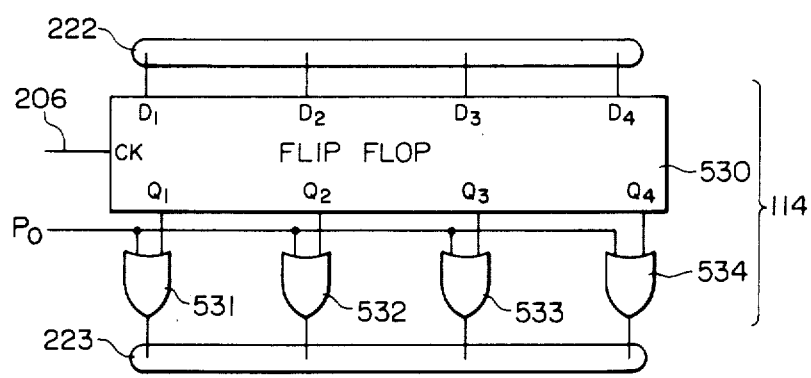
FIG. 9 shows an example of circuit configuration of an accumulator.

FIG. 9 illustrates a configuration example of the accumulator 114, which comprises an edge trigger type flip-flop 530 and logical sum gates 531–534. The data 222 is latched upon rising of the clock 206 and then provided to the logical sum gates 531–534. When the start bit PO assumes "1", all of outputs 223 becomes "1" through the logical sum gates 531–534. When the start bit PO assumes "0", the outputs from the flip-flop 530 appear directly as outputs 223.

The above mentioned embodiment makes it possible to execute a ladder sequence in parallel, thus resulting in an effect that the processing speed is improved.

In case of using an n-bit arithmetic unit, for example, the processing time required to run a sequence ladder of i columns and j rows is based on the number of steps (j×(i/n)), because the i columns may be divided into plural blocks each including n columns.

Generally, the ladder of i columns and j rows is not fully filled with constituent elements. Assuming now that the ladder includes input/output elements in the number of half the total elements, the average executing speed per one point is given as follows:

$$Ts \times J \times (i/n)/(j \times i/2)$$

where Ts is the processing speed of the arithmetic unit per one step.

It is assumed that n = 16, Ts = 1 (μsec), i = 512, j = 8, and input/output elements are about ½ of the total elements in number, the processing speed per one point becomes $1 \times 8 \times (512/16)/(8 \times 512/2) = 0.125$ μsec. This is about 8 times higher than the speed in case the bits are serially processed one at a time.

From the view point of hardware configuration, the present arithmetic unit is also suitable for LSI because it can be regularly configured. The program can be prepared with the image of one-to-one correspondence to the sequence ladder information that is to be prepared by a system engineer, so there can be further attained an effect that maintenance of the sequence program is easily attained.

Figure 10A:
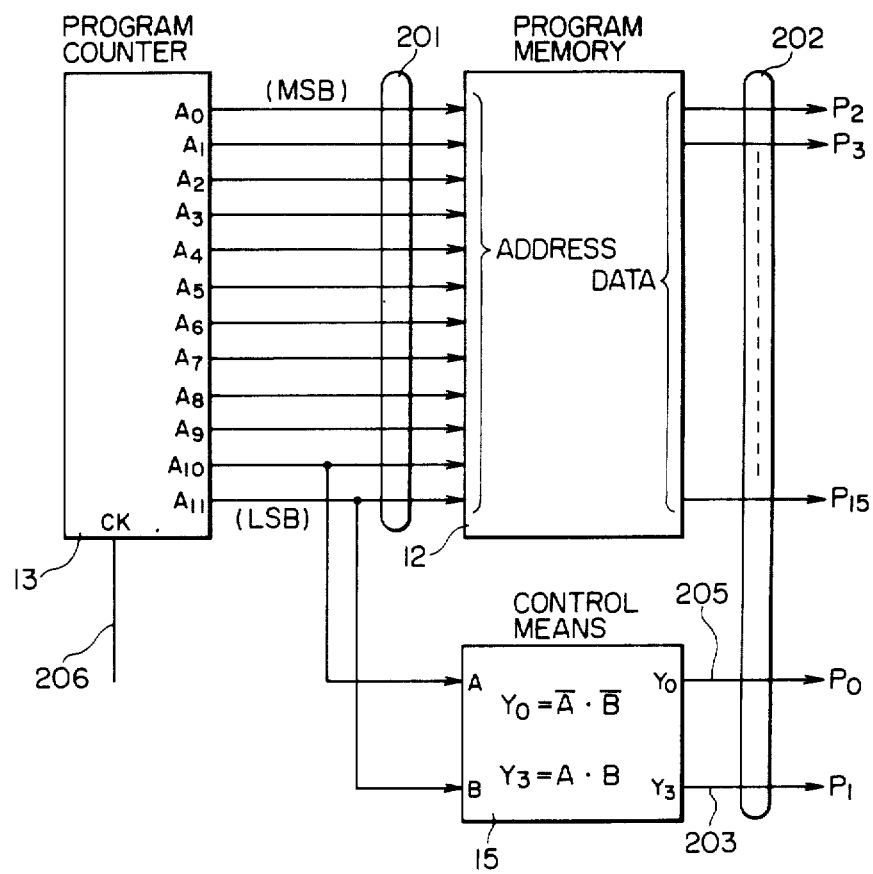
FIG. 10(A) shows another embodiment of the present invention.
Figure 10B:
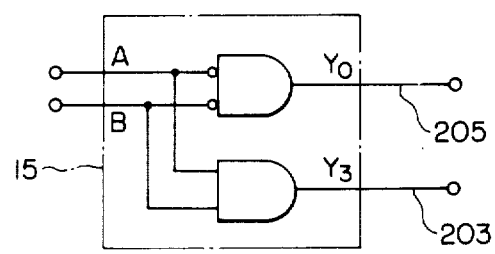
FIG. 10(B) shows a configuration example of a control section thereof.

FIGS. 10(A) and 10(B) illustrate another embodiment of the present invention. This embodiment is different from the processor of FIG. 3 in that both the sequence start signal P0 and the data output signal P1 are produced by the program counter 13 instead of the program memory 12.

With this, the number of steps from sequence start to operation output is fixed, while the bit width of the program memory is reduced by 2 bits. The illustrated embodiment shows the case in which sequence start is repeated for each 4 steps. Incidentially, a control means 15 can be realized using a 2 to 4 decoder.

Meanwhile, in case sequence start is repeated for $2^n$ steps, there may be established such a logic that the lower n bits of the program coutner of all "0" provides P0="1" and the lower n bits of all "1" provides P1="1".

By so doing, capacity of the program memory can be reduced.

Figure 11:
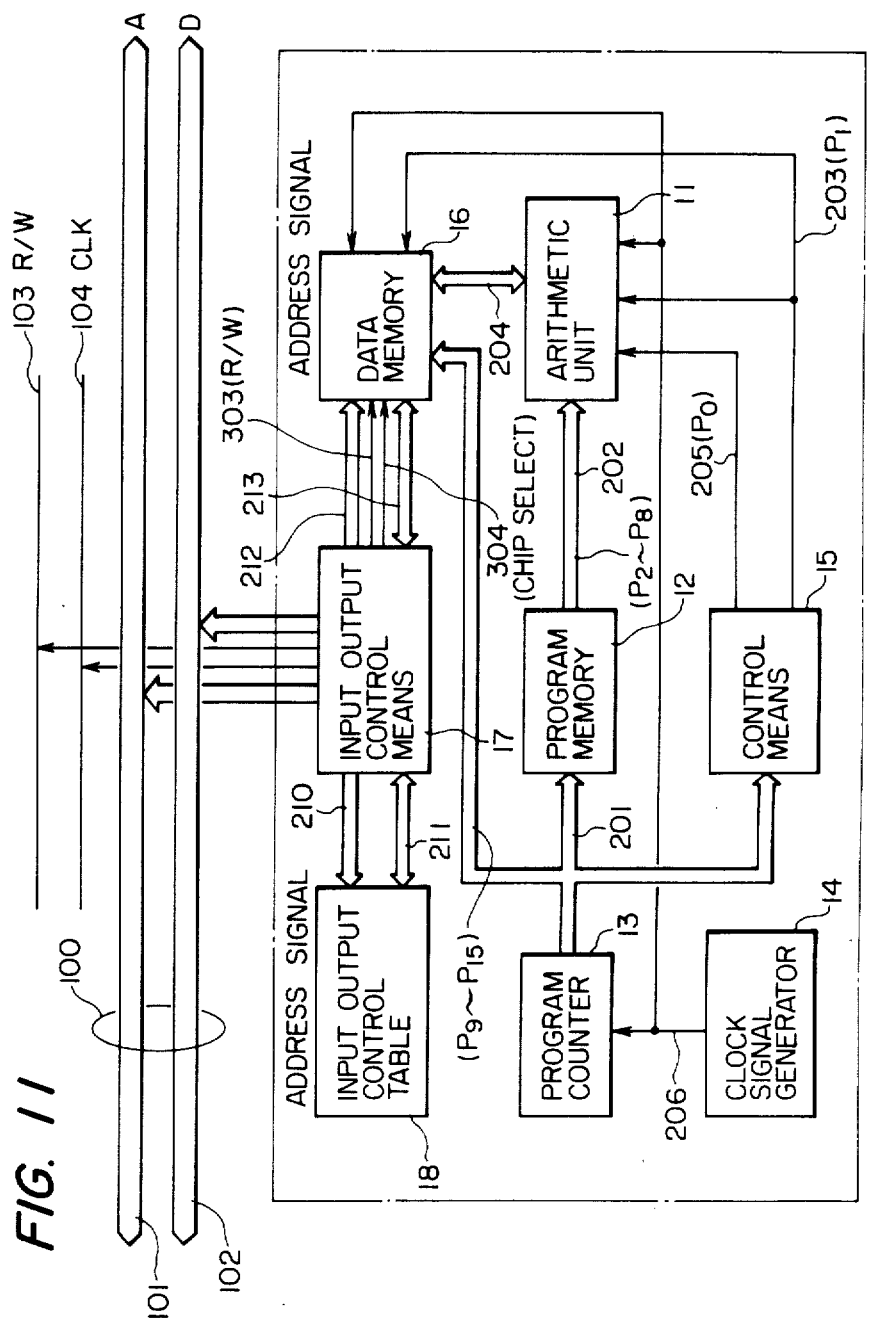
FIG. 11 shows still another embodiment of the present invention.

FIG. 11 illustrates still another embodiment of the present invention, which is different from the above embodiment that a data memory 16, an input/output control means 17 and an input/output control table 18 are additionally provided. An arithmetic unit 11 represents 111, 117, 113, 114 and 115 in FIG. 3 which are put together into a single block 11.

Figure 12:
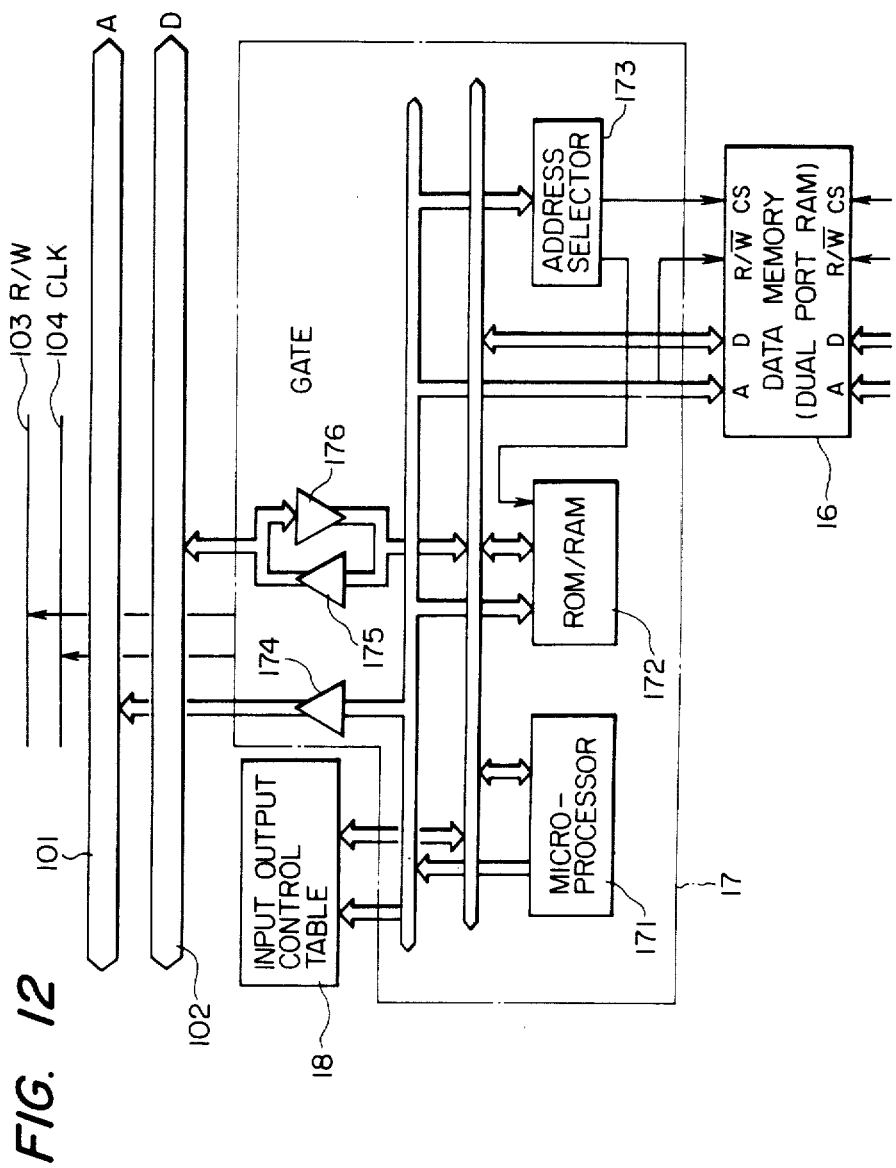
FIG. 12 shows a configuration example of an input/output control section.

FIG. 12 illustrates the internal configuration of an example of the input/output control means 17. The input/output control means 17 transfers the content of the data memory 16 to the process input/output or transfers the content of the process input/output to the data memory through buses 101, 102 in accordance with the content of the input/output control table 18. Namely, it has a function of logically separating the bit position of the process input/output from the bit position of the input/output on ladder sequence, thereby to enhance the degree of freedom in programming.

FIG. 13(A) illustrates the content of the input/output control table 18 corresponding to the example of the FIG. 12, and FIG. 13(B) illustrates the content of the data memory 16.

Adoption of this method makes it easier to expand the system because changes in input/output, if they occur, can be effected just by changing the input/output control table alone.

What is claimed is:

1. A method for processing a sequence control for a ladder sequence consisting of constituent elements including input contacts and output devices functionally arranged in i columns and j rows, comprising the steps of:
   (a) dividing said i columns out of said constituent elements of i columns and j rows into blocks of columns each including a predetermined plural number of columns;
   (b) storing an instruction in a memory unit for each row in said block of columns, said instruction being composed of a control portion including a bit indicating start of sequence and a bit for discriminating whether relay contact information is to be taken in or issued, a first operation code portion indicating whether input contacts of the ladder sequence are normally-OFF contacts or normally-ON contacts, a second operation code portion including bits for discriminating the presence or absence of connection between the adjacent columns, and an input/output address portion indicating addresses of the input contacts and output devices;
   (c) obtaining bit information corresponding to the ON/OFF condition of the input contacts for each row of said block of columns; and
   (d) processing the bit information for each row in said block of columns with a clock signal in accordance with said instruction stored in said memory means.

2. A sequence control method according to claim 1, further including the steps of effecting a logical product operation on a signal obtained by inverting bits of the input signal in accordance with said first operation code and the content of an accumulator, effecting a logical sum operation on the signal resulting from said logical product operation and the second operation code of said stored instruction, and then latching the resultant values in said accumulator.

3. In a central processor wherein a ladder sequence consisting of constituent elements including input contacts and output devices functionally arranged in i columns and j rows, said i columns being divided into blocks of columns each including a predetermined plural number of columns, and wherein arithmetic processing is run in accordance with an instruction stored in a memory unit with an ON/OFF status signal for each row of said block of columns as input data, and the resultant values are issued a central processor for sequence control comprising:
   (a) a program memory for storing therein an arithmetic processing instruction and for issuing said instruction in accordance with a read-out address;
   (b) input signal inverting means for processing bit information for a row in one block of columns with a clock signal to determine whether the input data bits are issued after inversion or directly, in accordance with a first operation code in the instruction read out from said program memory for said input data, said first operation code including bits for discriminating whether the constituent elements corresponding to said input data are normally-OFF contacts or normally-ON contacts;
   (c) logical product means for effecting a logical product operation with an output signal from said input signal inverting means and the content of an accumulator being both as input signals;
   (d) a column to column bit arithmetic unit for effecting an operation between bits in the adjacent columns for respective bits of the output data from said logical product means, in accordance with a second operation code in said read-out arithmetic processing instruction, said second operation code including bits for discriminating the presence or absence of logical sum (OR) connection between the constituent elements corresponding to said input data; and
   (e) an accumulator for latching an output signal from said column to column bit arithmetic unit.

4. A central processor for sequence control according to claim 3, said input signal inverting means being composed of exclusive logical sum means for the first operation code signal in said instruction and the ON/OFF status signal of said divided columns.

5. A central processor for sequence control according to claim 3, wherein said logical product means is composed of open collector type NAND gates each receiving the output signal from said inverting means and the signal of said accumulator as input signals.

6. A central processor for sequence control according to claim 3, wherein said column to column bit arithmetic unit is composed of transfer gates each receiving bit signals of the adjacent columns as input signals so as to be turned ON/OFF in accordance with the second operation code in said read-out instruction, said second operation code including bits for discriminating the presence or absence of logical sum (OR) connection between the constituent elements corresponding to said input data.

7. A central processor for sequence control according to claim 3, wherein said instruction stored in said program memory includes a control portion having signals including a start bit for the sequence and a bit for determining the direction of transmission of data in an input/output unit, which signals are obtained by a control means comprising a NAND gate and an AND gate and receiving two bits from the least significant bit (LSB), as input signals, of a program counter for determining the addresses to be used for reading-out from said program memory.

8. A central processor for sequence control according to claim 3, wherein an input/output control table, an input/output control means and a data memory are provided, and wherein a part of the output bits from a program counter is used as an address designation signal for said data memory.

* * * * *